May 10, 1960 W. C. RIESTER ET AL 2,935,759
WINDSHIELD CLEANING SYSTEM
Filed Feb. 21, 1956 4 Sheets-Sheet 1
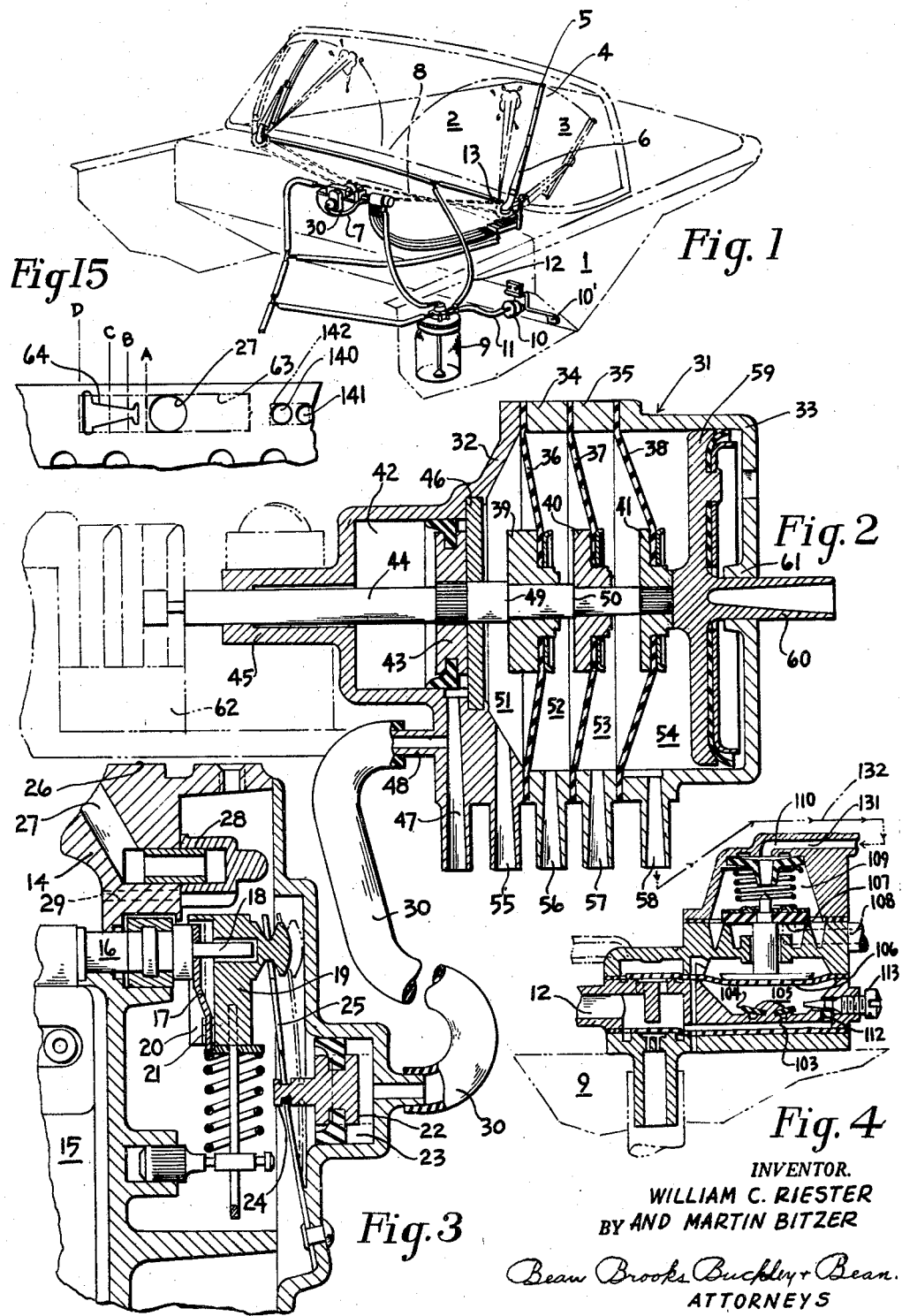
INVENTOR.
WILLIAM C. RIESTER
BY AND MARTIN BITZER
Bean Brooks Buckley + Bean.
ATTORNEYS

INVENTOR.
WILLIAM C. REISTER
BY AND MARTIN BITZER

Bean Brooks Buckley + Bean.
ATTORNEYS

May 10, 1960
W. C. RIESTER ET AL
2,935,759
WINDSHIELD CLEANING SYSTEM
Filed Feb. 21, 1956
4 Sheets-Sheet 3
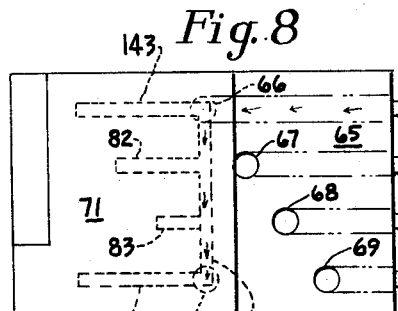
Fig. 8
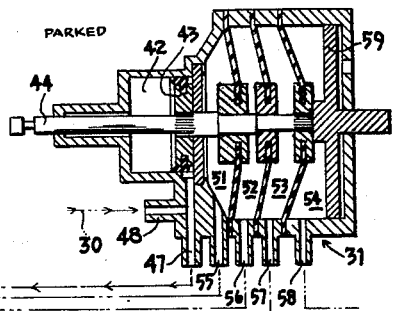
PARKED
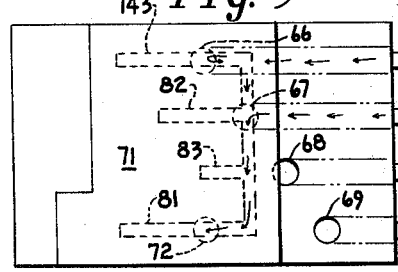
Fig. 9
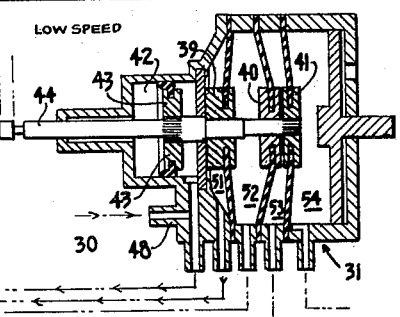
LOW SPEED
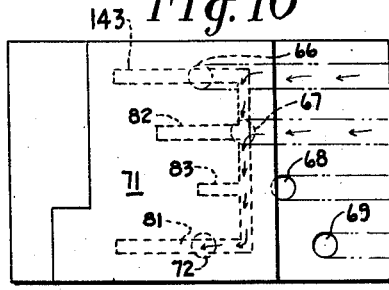
Fig. 10
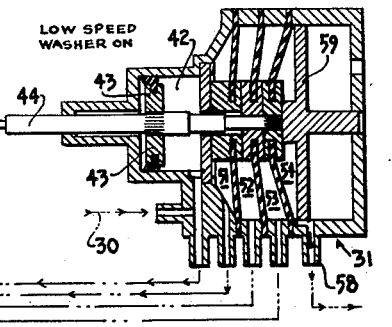
LOW SPEED WASHER ON
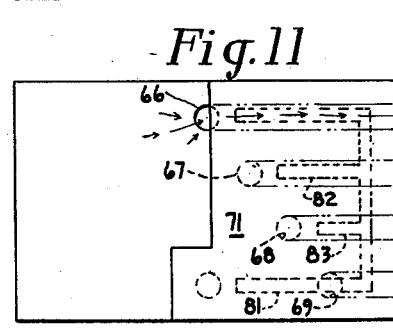
Fig. 11
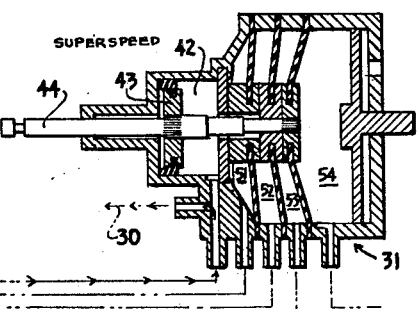
SUPERSPEED
INVENTOR.
WILLIAM C. REISTER
BY AND MARTIN BITZER
Bean Brooks Buckley + Bean.
ATTORNEYS

INVENTOR.
WILLIAM C. REISTER
BY AND MARTIN BITZER

Bean Brooks Buckley + Bean.
ATTORNEYS

United States Patent Office 2,935,759
Patented May 10, 1960

---

2,935,759

WINDSHIELD CLEANING SYSTEM

William C. Riester, Buffalo, and Martin Bitzer, Kenmore, N.Y., assignors to Trico Products Corporation, Buffalo, N.Y.

Application February 21, 1956, Serial No. 566,824

12 Claims. (Cl. 15—250.02)

This invention relates to the windshield cleaning art and more particularly to a windshield cleaning system incorporating means for regulating and controlling the operation of the wiper.

Ordinarily the wiper motor is mounted beneath or behind the instrument panel, or at some other remote point such as on the firewall within the engine compartment, thereby necessitating the use of a mechanical linkage between the motor valve and an actuator on the instrument panel, such linkage being in the form of a Bowden cable having a wire core enclosed within an armor. The motor control valve is slidably mounted on its seat and when subjected to a pressure differential imposes a friction factor to be overcome by the motorist along with the friction of the Bowden cable when it is desired to adjust or regulate the operation of the windshield wiper. The actuator is in the form of a knob that is connected through a rack and pinon and a Bowden cable to the control valve, and when the motor is regulated to obtain a desired speed of wiper operation, a care-taking adjustment must be made while overcoming the friction load in order to obtain small increments of movement of the motor throttle. With variations in precipitation, changes in the wiper speed are desirable. These further changes, when required, are not easily accomplished but must be precisely adjusted.

More recently the modern windshield wiper is designed to provide a modified wiping pattern to increase the frequency of rain lifting for use during heavy downpours and when traveling at the higher speeds permitted on today's express highways, turnpikes and thruways. Such an arrangement is shown in copending applications Serial No. 455,211 and Serial No. 468,669, now Patents No. 2,811,735 and 2,800,675, respectively, wherein motorized selectors are operative for changing from one wiper speed to another by changing from a panoramic pattern to a superspeed pattern.

The modified effect of the superspeed pattern affords the removal of moisture from the glass anywhere from 50 to 100% oftener in a given distance of car travel but without accelerating the velocity of the blade. Thus there is no tendency to skim over the surface. The same good quality of wipe of the conventional lesser speed of blade travel is maintained, and the whip of the blade at the higher velocity of travel is avoided.

Control means for shifting into and out of the higher frequency wiping pattern has been provided in the form of an auxiliary fluid pressure motor selector mechanism which is mounted on the wiper motor and made responsive to the same motive power used for wiping. The actuator for the wiping system embodies auxiliary power porting means and conduit coupling means through which the actuator is connected to the selector motor to combine the control means for the motor speed and pattern shifting in a unified mounting for ease of manual operation.

The purpose of the present invention is to facilitate the regulation of the wiper performance and to uniformly secure definite changes in wiper behavior. This is accomplished herein by the use of a power actuated selector mechanism that will remove the wiper adjustment from the uncertainty of human manipulation, the selector mechanism operating automatically to afford multiple preselected wiper speeds and reselections of the same in response to an indexing actuator which utilizes the advantage of mechanical exactness and precision to insure uniformity in succeeding selections of a given speed through predetermined increments of adjustment of the wiper motor control. Uniformity of speed in repeated selections of each is accomplished through the manually actuated indexer so that definite changes in the angular velocity of the wiper are repeatedly made in the same prescribed order. The power actuated selector mechanism comprises a multi-step positioning means, operatively connected to the motor control to give successive and predetermined steps of adjustment thereto at the touch of a button or lever.

The invention further contemplates a mechanism by which the pattern or extent of the wiping stroke is automatically shifted to a higher frequency of rain lifting action but in a narrowed pattern designed exclusively for the frontal area of the windshield. In the preferred embodiment this is accomplished by the use of multiple conduits interconnecting a single dual-acting feather-touch actuator responding in successive steps to repetitive movement of the actuator in one direction for selectively obtaining a given wiper speed, with or without the alteration of the wiper pattern, while with another movement of the actuaor the wiper is automatically stopped and parked.

A further object of the invention is to provide a powered wiper speed selector embodying a washer coordinating control to secure a wetting of the windshield to facilitate the removal of foreign matter from the field of vision at fast wiper speed in a full width or panoramic pattern, or in a restricted range at higher frequency wiping. This coordination is under the control of a second actuator which will also automatically return the mechanism either to a preset lower wiping speed or to a wiper parked position after a prolonged wiping interval following the wetting cycle. The indexing actuator will enable the wiper to be selectively set in operation at any one of the wiper speeds, low, intermediate or high, at the time of starting the wipers through a prescribed series of functional feather-touch operations on the indexer. The wiping pattern changeover from a high frequency short pattern to a relatively slower frequency full panoramic pattern is herein accomplished by reversing the touch of the dual acting indexer.

In accordance with the present invention the human element has been largely removed from the control of the wiper mechanism, the primary purpose of which is to provide a power-actuated mechanism by which predetermined or definite speeds of wiper operation may be preselected and effected through a master control with minimum effort.

A further object of the invention is to provide a mechanically powered selector for obtaining predetermined speed adjustments in one wiper pattern and a change to another pattern at a higher frequency of oscillation, with or without the application of a liquid solvent, all manipulations being brought within a unidirectional finger touch control of the motorist and with minimum distraction from his control of the vehicle. In other words the device provides a means whereby the process of touch may be used to supplant the process of deliberate thinking, for automatically setting the wiper speeds in preset range.

The progress in motor car designing has included the introduction of engineering changes which already include such forward steps as automatic shifting of gears which changes with the variations in the speed of car travel, automatic car ride controls, the application of power for ventilating, and the control of car windows. These devices have been made easily controllable with a minimum of effort in many instances by the inclusion of button controls through means of which the car operator is enabled to readily manipulate various vehicle appurtenances. Here it is proposed to primarily provide improvements in the vitally important, wet weather vision equipment. But equally important, this vision equipment is being mechanized in a manner that will induce its fullest use by making the near effortless manual manipulation of wiper controls automatic.

An objective of the invention is to invite more frequent use of varying wiping speeds, including an alterable arc of blade travel to readily adjust the wiper to traffic and weather conditions to afford relief from eyestrain and unsafe wiper motion monotony.

The foregoing and other objects will manifest themselves as this description progresses, reference being had to the accompanying drawings, wherein Fig. 1 is a fragmentary perspective view of a motor vehicle having the improved windshield cleaning system with a foot actuated washer unit incorporated therein;

Fig. 2 is a longitudinal sectional view through the pattern and speed selector and washer coordinator;

Fig. 3 is a fragmentary sectional view of a dual range windshield wiper motor;

Fig. 4 is a cross sectional vew of the hydrostatic valve assembly utilized in the windshield cleaner system;

Figs. 8, 9, 10 and 11 are diagrammatic views showing the speed and pattern selector and washer coordinator in parked position, in low speed position, in low speed position with the washer on, and in superspeed position, respectively;

Fig. 15 is a fragmentary view of the wiper control valve seat showing diagrammatically the several throttling positions in the suction supply line.

Figure 6:
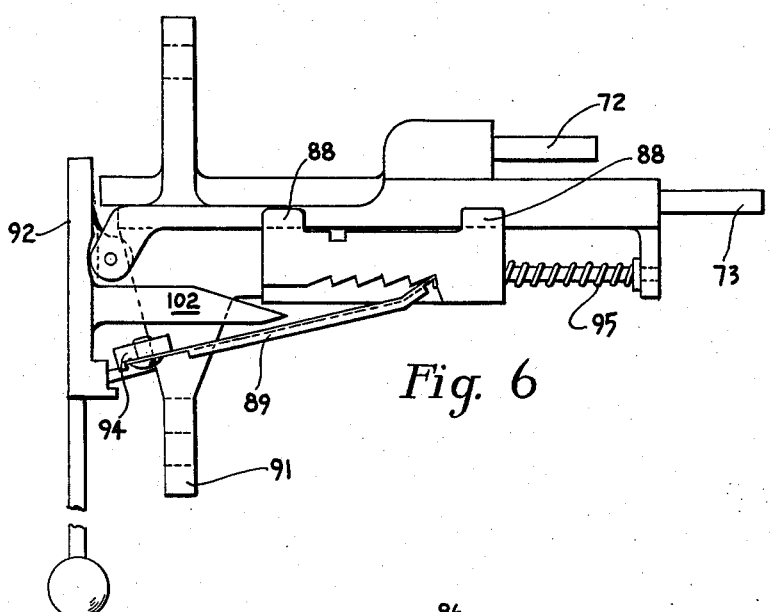
Figs. 6 and 7 are side elevations of the indexing actuator unit looking respectively from the opposite sides thereof, Fig. 6 being inverted relative to Fig. 7.

Referring more particularly to the drawings, the numeral 1 designates a motor vehicle having a windshield of the panoramic type with a relatively flat frontal area 2, a lateral area 3 and a connecting crest area 4 over which areas the wipers 5 are oscillated by arms 6 fixed to respective pivot shafts that are oscillated by a motor 7 through a transmission 8. A windshield washer reservoir 9 is connected to a foot actuated pump 10 by a conduit 11, the pump being operable to deliver liquid solvent through a conduit 12 and nozzle 13 onto the windshield into the path of the wiper. The wiper motor is of the dual range type shown and described in the above copending application and comprises a motor casing 14 having a chamber enclosing a vane-like piston 15 carried by the drive shaft 16. Fixed on the shaft is a trip arm 17 for being oscillated therewith, and mounted on the protruding end 18 of the shaft is a kicker 19 that is axially shiftable to position one or the other of two pairs of lugs 20 and 21 selectively in the plane of the trip arm for affording either a full panoramic pattern for the wiper or a relatively higher frequency shorter pattern confined primarily to the frontal area. The kicker is axially shifted by an auxiliary motor having a piston 22 which operates in a small chamber 23, the piston stem 24 being connected to a kicker carrying spring lever 25 so that when suction is applied to the piston 22, it will withdraw the kicker to the dotted line position, Fig. 3, and when the small chamber 23 is open to the atmosphere the spring lever 25 will return the kicker to the full line position. The wiper motor 7 has a ported seat 26 from which leads a suction supply passage 27 to a rockable valve 28, the latter being rocked back and forth by the kicker to connect the supply port 27 alternately to one or the other of the chamber ports 29.

The kicker positioning motor 22, 23 is connected by a conduit 30 to a power actuated selector unit 31 in the form of a multi-stage motor and, in the illustrated embodiment, comprises cup-shaped end or head sections 32 and 33 and two intermediate sections 34 and 35, embracing the peripheral margins of the diaphragms 36, 37 and 38, each diaphragm having reinforcing annuluses 39, 40 and 41, respectively The end section 32 is provided with a cylindrical chamber 42 slidably receiving a piston 43 that is fixed to a coupler rod 44 which is slidably supported in an end bearing 45 and a cylinder-closing wall 46 against which the piston normally abuts under a pressure differential set up by the low pressure supplied through a passage 47 on one side and the atmospheric pressure on the opposite side as admitted by the bearing 45. A nipple 48 extends laterally from the suction passage 47 for connection to conduit 30, so that when suction maintains within the supply passage 47 it will also maintain in the kicker positioning motor 22, 23 to hold the kicker in its wide panoramic range as shown in the dotted showing of Fig. 3. The coupler rod 44 protrudes beyond the partition wall 46 and slidably supports the reinforcing annuluses 39, 40 and fixedly supports the annulus 41 on its extreme end. Annulus 39 is adapted to abut shoulder 49 on the coupler rod while annulus 40 is adapted to abut the shoulder 50 formed on the rod. The diaphragms partition the motor casing into a low speed chamber 51, an intermediate speed chamber 52, a high speed chamber 53 and a washer energizing chamber 54, these four chambers being provided with nipples 55, 56 57 and 58. Within the chamber 54 is mounted a floating washer-energizing piston 59 having a stem 60 that has slidable support in the bearing 61 in the end wall of end section 33. The forward end of the coupler rod 44 is connected to the wiper control valve 62 which, among other port connecting recesses, is formed with a recess 63 for connecting the supply passage 27 to a graduating port 64 in a manner to block off the port from the passage in position A in Fig. 15, for parking the wiper, to partially open communication between the passage and the port in position B, for low speed wiper operation, to enlarge the communication in position C, for an intermediate wiper speed, and to fully open the communication between the passage and the port in position D, for fast wiper speed, all in the wide panoramic range.

An actuator in the form of a multi-ported valve is diagrammatically shown in Figs. 8, 9, 10 and 11 as comprising a flat seat 65 having a stepped series of ports 66, 67, 68 and 69 which are selectively connected by a transverse port connecting channel 70 in the undersurface of a valving member 71. The valve seat also has a suction supply port 72 which in the normally parked position is connected by the channel 70 to port 66, which latter has a nipple 73 connected by a hose 74 to the passage 47 of the high frequency motor chamber 42. In this normally parked position the actuator valve 71 exposes the ports 67, 68 and 69 to the atmosphere, these three ports being connected by nipples 75, 76, 77 and hoses 78, 79 and 80 to the motor chamber nipples 55, 56 and 57, respectively. Therefore, in normally parked position the coupler rod 44 is withdrawn to hold the piston 43 against the partition wall 46 and to move the washer piston 59 inwardly within its cupped chamber 54 in which position of the coupler rod the several diaphragms will be held spaced apart by the shoulders 49 and 50, as shown in Fig. 2.

From this normal position wherein the wiper is parked the motorist may shift the actuator valve 71 from the position shown in Fig. 8 to that shown in Fig. 9 to bring the transverse port connecting channel 70 over the port 67 to connect the latter to the suction supply port 72 by reason of a longitudinal extension groove 81 of the channel 70. This establishes communication between the low wiper speed port 67 and the low speed chamber 51 to act upon the motor piston or diaphragm 36 to act through its shoulder 49 and shift the coupling rod 44 along with the motor control valve 62 to position B, Fig. 15, by reason of which the wiper motor is given restricted communication with the source of suction to cause it to operate at a low speed, as for example, 60 strokes per minute. Should the actuator valve 71 be restored to its normal position, the port 67 will be opened to the outside thereby reestablishing the pressure differential on the piston 43 to move the wiper motor control 62 to its wiper parking position.

Should a faster wiper speed be desired, the actuator valve 71 will be moved to connect the intermediate wiper speed port 68 and port 72 by means of the channel 70 to thereby open selector motor chamber 52 to the source of suction, and by reason of the extension groove 82 to concurrently establish suction communication through the port 67 with the low speed chamber 51 with the result that the motor diaphragm 37 will drive against its shoulder 50 to act through the coupler rod to move the control valve 62 to position C for increasing the suction supply to the wiper motor whereby to bring in the increased wiping action at an increased frequency, for example 120 strokes per minute. Both of these motor chambers 51 and 52 cause the wiper to operate in its wide panoramic range, and in order to secure a still faster wiper speed in the panoramic range the motor chamber 53 is evacuated by shifting the actuator valve 71 to a third position in which the port connecting channel 70, or its longitudinal extension groove 81, is placed in communication with the high wiper speed port 69 in which position the motor chamber 53 is evacuated to cause its diaphragm 38 to drive the wiper motor control 62 to position D in Fig. 15 which provides the fullest communication with the source of suction for accomplishing the fastest wiper speed in the wide panoramic pattern, for example, 180 strokes per minute. At the same time, the low wiper speed port 67 will be maintained under suction by its extension groove 82 and the intermediate wiper speed chamber 52 will be maintained under vacuum by reason of a third longitudinal extension groove 83 moving over the intermediate wiper speed port 68. Therefore, all three selector motor chambers 51, 52 and 53 will be under the same vacuum.

The fluid displacement of the motor piston-forming diaphragms 36, 37 and 38 is identical and imparts the same motive force on the coupler rod to shift the wiper motor control accordingly. To the contrary, the restorative piston 43 has a relatively smaller displacement so that its normally acting restorative force applied to the wiper motor control valve will be counteracted by the relatively stronger motor unit 36, 37 and 38 to shift the control valve to the selected position. For example, if the restorative force of the piston 43 is one pound and the opposing speed selecting force of any one of the three diaphragms is two pounds, it will be apparent that when the actuator valve 71 is shifted to a speed selecting position it will dominate the restorative force and move the wiper control valve to the selected position. Again, referring to Fig. 9, the dominating force imposed by the diaphragm 36 has not only shifted the motor control valve to a low speed position but has also shifted the restorative piston 43 along therewith away from the partition 46 even though the piston is still subjected to suction from passage 47. While the present selector has been described as functioning to preselect the three panoramic speeds of wiper operation a differing preselection may be effected if desired.

Figure 5:
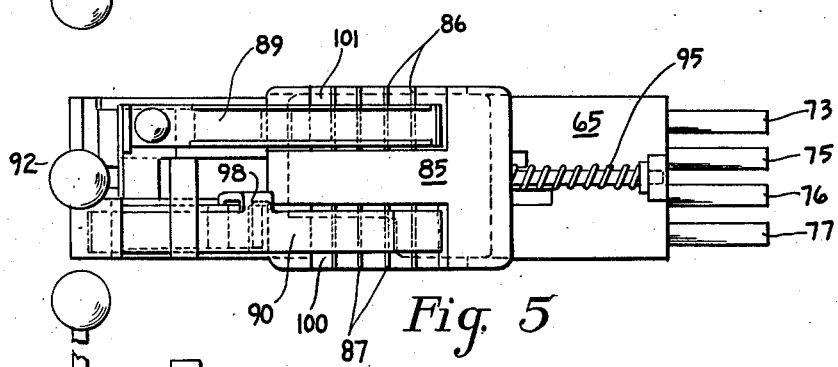
Fig. 5 is a plan view of the indexing actuator unit.
Figure 7:
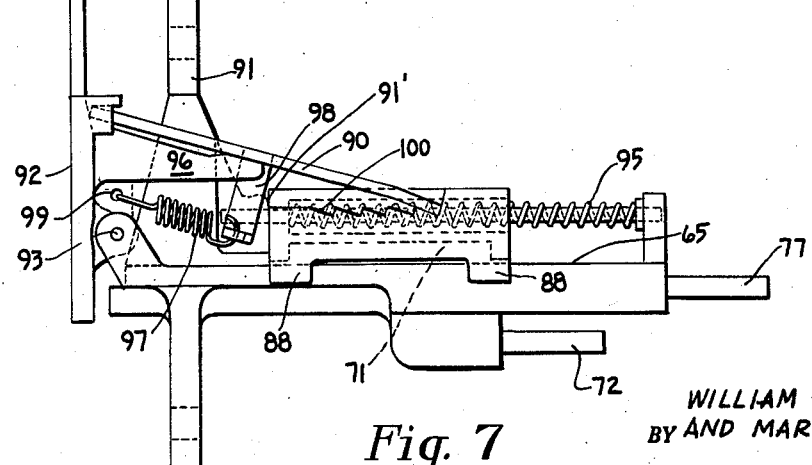

In order to definitely graduate the wiper speed selection, there is shown in Figs. 5, 6 and 7 an indexing unit for advancing the actuator valve 71 step by step. The valve is in the form of a rubber body in which the port connecting channel and longitudinal extension grooves are formed. The rubber body is fitted in a recess 84 of a reinforcing slide 85, the back of which is provided with two ratchets 86 and 87 while the underside of the slide body has depending guide lugs 88 that straddle the flat seat 65 to guide the valve 71 in its longitudinal path over the seat. Coacting with the teeth of the two ratchets are pawls 89 and 90. The valve seat 65 is supported by a mounting bracket 91, and rockably mounted on this bracket is a lever or button 92. In Fig. 7 this lever is supported on a horizontal pivot 93. The valve advancing pawl 90 is pivotally connected to the lever 92 above the pivot 93 so that depression of said upper end will cause the forward end of the pawl to push upon its engaged ratchet tooth to advance the actuator valve one prescribed increment of movement as determined by the length of the tooth. At this moment the pawl 89 will spring into engagement with one of its ratchet teeth and retain the valve in such position while the advancing pawl rides backwardly to engage the next adjacent tooth for effecting the next succeeding increment of movement to move the valve to its second speed selection. For this reason the retaining pawl 89 may be of spring stock and anchored on a fixed part 94 of the bracket 91. The advancing movement of the actuator valve is against the urge of a coil spring 95 which latter functions to return the actuator valve to its parked position when the indexing lever 92 is given a reverse rocking movement. During this reverse movement of the lever an arm 96 on the lever is designed to engage the pawl 90 and lift it from its engaged tooth or notch against the urge of its spring 97 to free the valve for being so returned to its wiper parking position by the spring 95. The pawl spring 97, in the form of a coil spring, has one end anchored to a lug 98 on the advancing pawl and its opposite end to an anchor part 99 on the indexer 92. The extent of forward rocking movement of the lever is limited by the upper end of the lever engaging a stop shoulder on the bracket 91 and thereby limiting the forward movement of the actuator valve to an increment of movement equal to the spacing between adjacent teeth of the ratchet. Consequently, to move the actuator valve 71 from its parked position to operate the automatic selector 31 to set the windshield cleaner system in low wiper speed will require one depression of the upper end of the lever 92. A further advance of the actuator valve cannot be made until the lever is released to permit the advancing pawl to ride backwardly one tooth while the valve is being retained by the fixedly mounted spring pawl 89. A second touch on the lever will impart an additional increment of movement to the valve before the retaining pawl 90 will engage behind the next tooth 87, to set the windshield system for operating at the intermediate speed. A third touch on the upper end of the lever, after the latter has first returned to its normal position, will impart a third increment of movement to the slide 85 and its carried valve 71 to bring the wiping system into its top wiper speed for the panoramic pattern wherein the diaphragm 38 exerts its driving force on the coupler rod while the diaphragms 36 and 37 idle with respect thereto even though all three chambers 51, 52, 53 are under suction. A second pawl lifting arm 102 on the lever serves to disengage the retaining pawl 89 to permit the return spring 95 to function.

There is a final position of ratchet adjustment to take the valve-positioning selector 31 out of the panoramic pattern and into a narrowed high frequency pattern confined solely to the frontal area for superspeed operation, for example 270 strokes per minute, affording a high frequency short stroke wiping action designed especially for fast driving on express highways, turnpikes and thruways, or in heavy downpours to increase the frequency of rain lifting wipes across the forward line of sight. This change in pattern from the panoramic range to the high frequency range is accomplished by this final movement of the indexer by engaging the valve advancing pawl 90 into engagement with the tooth or notch 100 and, at the conclusion of this final movement of the actuator valve 71, the retaining pawl will drop into engagement with its final tooth 101 and hold the wiper system in its superspeed narrowed pattern. This final shift of the actuator valve to its superspeed position uncovers the port 66, Fig. 11, and at the same time the extension groove 81 moves out of communication with the suction supply port 72, with the result that the port 66 constitutes a vent to the atmosphere and admits atmospheric pressure through the hose 74 and passage 47 into the chamber 42 behind the piston 43 to thereby unbalance the latter by reason of the static vacuum in the motor chambers 51, 52, 53. To cancel the high frequency pattern, the indexing lever is rocked backwardly to lift the arm 102 up against the underside of the retaining pawl 89 to displace the latter and thereby release the spring 95 to function.

To bring the washer into operation, the pump 10 is actuated to force water out through the passage 12 and in addition a branch passage 103 up past a check valve 104 into a trap chamber 105 for exerting a lifting force on the diaphragm 106 to unseat the normally closed valve 107 and thereby establish connection between the suction line 108 and a chamber 109 which communicates through a suction passage 110 with the selector nipple 58. The reaction to this is shown in Figs. 9 and 10. In the former view, the diaphragm 36 is acting to place the wiper system in operation on low speed, but when the pump is operated the hydraulic pressure opens the suction conduit 110 to the washer energizing chamber 54 to move its piston 59 to exert a driving force, of say four pounds, on the coupling rod 44 to crowd the several diaphragms to the position shown in Fig. 10. A breather opening 111 admits atmospheric air behind the washer energizing piston 59. The trap chamber has a bleed passage 112 which may be variably restricted by a threaded valve 113 in order to prolong the wiping action after the washer is arrested. This washer action is shown more particularly in copending application Serial No. 542,619.

Figure 12:
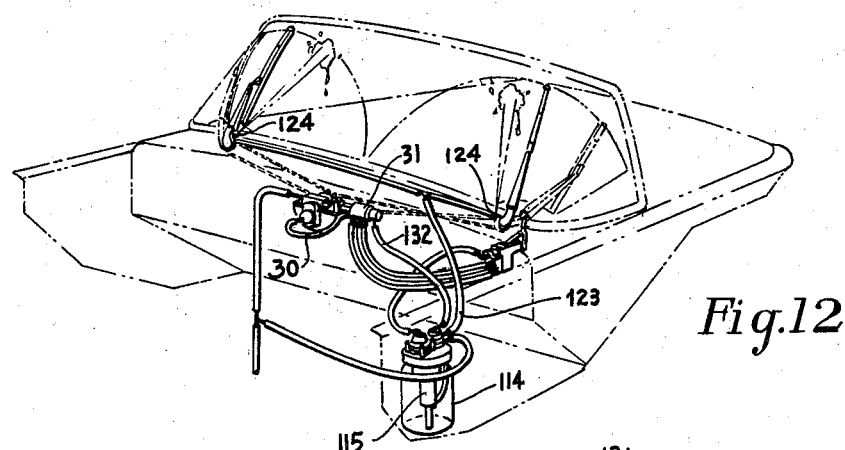
Fig. 12 is a view similar to Fig. 1 but showing a suction actuated washer unit.
Figure 13:
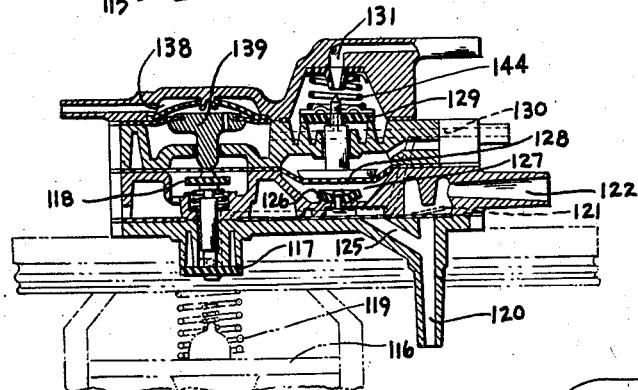
Fig. 13 is a view similar to Fig. 4 but showing a modified hydrostatic valve assembly.
Figure 14:
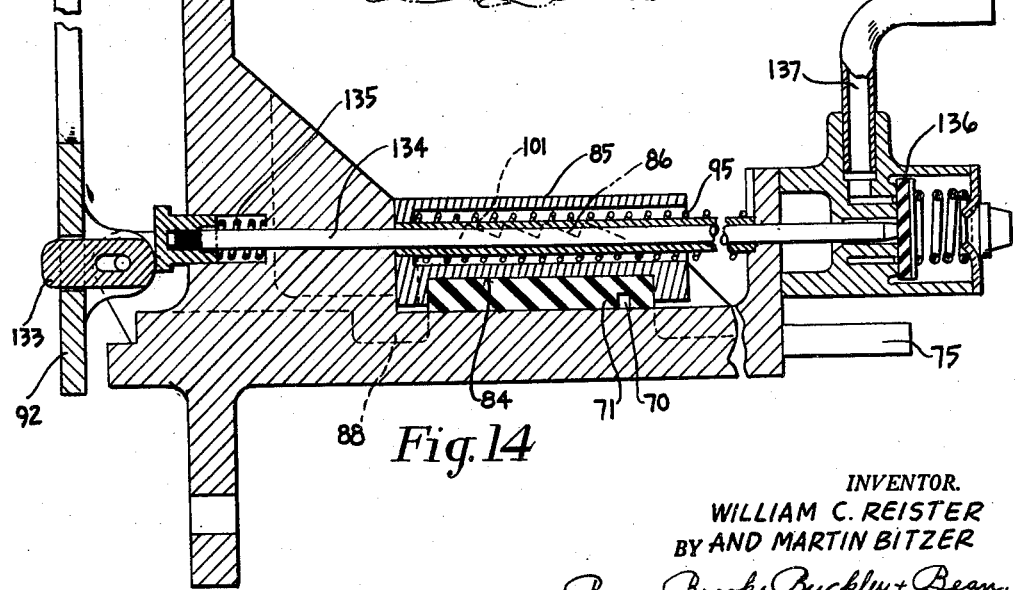
Fig. 14 is a longitudinal sectional view of a modified indexing actuator unit.

In the modification shown in Figs. 12 and 13, an automatic washer is shown after the disclosure of another copending application Serial No. 530,970, now Patent No. 2,877,486, wherein the washer reservoir 114 has a suction actuated pump 115.

The suction actuated pump 115 has a spring returned plunger adapted to be lifted by suction on its liquid intaking stroke. Thereafter the plunger 116, at the end of its intaking stroke closes a suction valve 117 and concurrently unseats an atmospheric valve 118 to permit the spring 119 to function on its liquid discharging stroke, thereby to force the liquid out through passage 120 past check valve 121 and out through passage 122, through hose 123 up to the washer nozzles 124. This outflowing liquid being under the pressure of the spring actuated plunger 116, also will flow through a branch passage 125, past a check valve 126 into a trap chamber 127 so that the hydrostatic pressure build-up in this chamber will exert a lifting force on the diaphragm 128 to unseat the valve 129 for opening communication between the suction supply passage 130, from the intake manifold or other source of vacuum, with the result that the passage 131 which leads through hose 132 and nipple 58 of the selector unit 31 to place the washer energizing chamber 54 under suction and provide an actuating pressure differential on the floating, washer-energizing piston 59. In order to initiate this washer action a button 133 is provided on the indexing lever 92 for being depressed through an opening therein to shift a valve actuating rod 134 against the urge of a spring 135 to unseat a valve 136 in a passage 137 leading to the chamber 138 to admit atmospheric pressure above the actuator 139 to unbalance the latter thereby to depress the actuator against the atmospheric valve 118 for unseating the suction valve 117.

In the operation of the indexing windshield cleaning system of the present invention, to start the wiping action the motorist simply depresses the indexing lever 92 inwardly to move the actuator slide and valve unit 71, 85 one increment of adjustment to move the channel 70 from the parked position of Fig. 8 to the low speed position of Fig. 9 to bridge the port 67 with ports 66 and 72 by reason of the extension grooves 81 and 143, whereupon the selector motor chamber 51 will be evacuated and its diaphragm 36 energized to move the coupling rod 44 to shift the wiper motor control valve 62 to bring its recess 63 for bridging the supply port 27 and port 64 with the most restricted communication. At the same time, the chamber 42 behind the parking piston 43 is kept under suction as well as the kicker positioning motor 22, 23, as they are in their normally parked position, in order to hold the wiper motor in its wide range panoramic state. For parking the wiper the indexing lever is swung back beyond its normal parked position to disengage the retaining pawl 89 whereupon to permit the spring 95 to return the slide to its normal position against shoulder 91' at the inner end of the valve seat 65 on the bracket 91. Upon the release of the indexing lever 92 the spring 97 will restore it to its normal wiper parking position to permit the pawls 89 and 90 to reengage their respective ratchets, but with the pawl 90 engaging the second tooth of ratchet 87. Now should it be desired to attain the next higher wiper speed the indexing lever 92 will again be rocked forwardly from its normal position to advance the actuator valve 71 its second increment of movement to cause the channel 70 to register with the port 68 to thereby evacuate the second selector chamber 52 which through its contact with shoulder 50 will shift the motor control valve 62 to position C, Fig. 15, so as to move the coupling rod 44 an additional movement equal to the spacing between the reinforcing rings 39 and 40. For attaining the highest speed in the panoramic pattern, the indexing lever 92 will again be restored to normal position for reengaging the advancing pawl 90 with its ratchet 87 at its third tooth to thereby shift the wiper motor control valve to position D for the fastest speed in the panoramic pattern in which position the three selected motor chambers 51, 52, 53 will all be under vacuum but the diaphragm rings 39 and 40 will be idling while the ring 41 through its fixed connection to the coupling rod will impart a driving force thereto to move the control valve 62 to such position D. The graduated port 64 will in parked position be always blocked from the suction supply port 27 by reason of the shift of its recess 63 from off the port 64. However, the valve seat 26 is provided with a second supply port 140 and a parking port 141 normally bridged by a second recess 142 in the control valve 62 which supplies the recess pressure differential on the parking piston 43.

Now should it be desired to wet the surface, the washer will be brought into coordinating relationship with the wiper, as by depressing the pump actuating pedal 10', or by depressing the button 133 to unseat the valve 136 thereby admitting atmospheric pressure to the chamber 138 for unbalancing the valve depresser 139 for energizing the pump 115. In both instances the discharge from the pump will flow to the spray nozzles 13 and 124 respectively and admit an energizing portion of the pressurized liquid into the trap chambers 105 and 127, respectively, for establishing a suction communication between the source of negative pressure and the selector motor chamber 54 to move the piston 59 to the position shown in Fig. 10 to bring the wiper motor to its top panoramic speed. This position of the parts is maintained until the pressurized liquid in the trap chambers dissipates through the bleed passage 112, the trap chamber 127 having a like bleed passage for retarding the valve closing action of spring 144 to interrupt the suction communication. After the hydraulic pressure has dissipated from the trap chamber and the suction communication with selector chamber 54 is interrupted, then the parking piston will take over and restore the wiper motor control valve to its parked position or to a previously selected lower wiper speed.

When it is desired to attain a still higher frequency of wiper strokes, such as during heavy downpours or when traveling at the higher speeds of travel permitted on express highways and thruways, though in a narrowed pattern confined primarily to the frontal area, the indexing lever 92 is rocked to have the advancing pawl engage with the superspeed tooth 100 for advancing the actuator valve to its fourth speed of adjustment where it is retained by the pawl 89 engaging tooth 101. This will result in reversing the pressure differential on the parking piston 43 by reason of the fact that the actuator valve 71 has uncovered the port 66 to the atmosphere and thereby admitted atmospheric pressure through the passage 47 behind the parking piston 43. Additionally, atmospheric pressure is thereby also admitted into the kicker positioning motor 22, 23 to allow the spring lever 25 to poise the trip arm 17 between the more closely positioned shoulders or lugs 21. The kicker will therefore be tripped more frequently at the end of the narrowed pattern or shorter wiping stroke. When the system is changed back to the panoramic pattern, as for example to the low speed shown in Fig. 9, the passage 47 will again be placed under suction to withdraw the kicker positioning piston 22 to its wide panoramic range, this being accomplished through restoring the actuator valve 71 to its parked position. The improved wiper system facilitates the adjustment of the wiper, the same requiring a simple operation of depressing the indexer, with a minimum manual effort to accomplish definite and uniform adjustments with manual exactness. The impulse-receiving indexer through successive uni-directional adjustment sets in operation a power unit to initially start the wiping system in slow speed over the wide panoramic pattern. A second touch on the indexer produces an intermediate speed while a third touch effects the highest speed in the panoramic pattern. A fourth touch automatically changes the pattern and shifts to the higher frequency shorter wiping stroke range for wiping the field of vision more frequently in heavy rains, during higher speeds of travel, and to combat heavy wheel spray thrown into the line of sight. As above stated, by way of example, the low speed adjustment may be set for 60 strokes per minute, the intermediate speed for 120 strokes per minute, the third speed for 180 strokes per minute, and then after removal of the wiper from the panoramic range, a speed up to 270 strokes a minute may be attained. The wiper system may be adjusted to attain different wiper speeds than those recited, and the number of intermedaite wiper speeds may likewise be varied. The indexer takes over to carry through the wiper speed adjustment after the initial touch and consequently carries through with a precision that insures constant speed selection at each stage of adjustment.

Therefore, the chance of error being made in the selections is removed and uniformity is assured, and while the foregoing description has been given in detail, it is without thought of limitation, since the inventive principles involved are capable of assuming other physical embodiments without departing from the spirit of the invention and the scope of the appended claims.

What is claimed is:

1. A windshield cleaner system comprising a wiper, a fluid motor for moving the same back and forth and having a control valve adjustable to vary the number of wiping strokes per minute, a power actuated selector operatively connected to the control valve to give predetermined adjustments thereto for full wiper speed and an intermediate speed, and a preselecting valve operable in response to repeated control motions to energize the selector for mechanically effecting said valve adjustments.

2. A windshield cleaner system comprising a wiper, a motor having a control selectively operable from a parked position either to a low speed position or to a high speed position of wiping, a powered speed selector operatively connected to the control to adjust the latter to positions for high and low wiper speeds, and a manual indexing actuator for the selector, said actuator including a ratchet mechanism operable by repeated uni-directional control motions.

3. A suction actuated windshield cleaner comprising a wiper, a fluid power unit for operating the same and having a control valve movable from closed to fully opened positions and to an intermediate open position, a power actuated selector connected to the control and having a parking part and high and intermediate speed parts connected to the control for selectively actuating the latter to secure a high wiper speed, a predetermined intermediate wiper speed and a wiper parking action, and a manual indexing actuator for the power actuator selector operable in response to repetitive actuation to successively actuate said selector parts and thereby vary wiper speed.

4. A windshield cleaning system comprising a wiper, a motor for oscillating the same having a control adjustable to vary the speed of wiper operation, a power actuated speed selector for the control having presettable means for adjusting the control to give predetermined lower and higher speeds of wiper operation, a manual indexing actuator for said speed selector, a washer, and coordinating means operatively interconnecting said washer and said selector and operable to energize the washer and select the higher wiper speed.

5. A windshield cleaning system comprising a wiper, a motor for oscillating the same having a control adjustable to vary the speed of wiper operation, a power actuated speed selector for the control having presettable means for adjusting the control to give predetermined speeds of wiper operation, a manual indexing actuator for said speed selector, a washer, coordinating means operable to energize the washer for a predetermined time interval at higher wiper speed and to continue such higher wiper speed for a time interval following the washer operation, and said coordinating means operable thereafter either to park the wiper or to maintain a preselected lower wiper speed operation.

6. In a windshield cleaner system having a control to modify the rate of running speed of a windshield wiper motor, said control comprising in combination an indexing actuator for the setting of a predetermined rate of power flow to said motor, said actuator being coupled to a throttle controlling selector means whereby the power source for said motor is employed to regulate the motor speed, and said selector being likewise responsive to the same power source to uncouple said motor from said power source and utilize the power to park the windshield wiper blades.

7. A windshield cleaning system comprising a wiper, a motor connected thereto for operation at various wiper speeds, a speed control therefor, a control motor for actuation of said speed control, and a ratchet controlled multi-position control mechanism for said control motor to effect operation of said wiper motor for various predetermined speeds of wiper operation.

8. In a windshield wiper system including a power actuated throttle for a windshield wiper motor, said throttle being actuated through a fluid powered multiple sectioned coupler, an indexing actuator means responsive to repeated unidirectional motions of a touch-button control to selectively and successively move said coupler sections into preset motor throttle operating positions and means operable in conjunction with said indexing actuator in response to a single motion of said control to cancel the indexed position of said actuator and return said actuator to a normal position while simultaneously functioning to reposition the coupler sections from their various motor operation positions.

9. A windshield cleaning system comprising a wiper, a motor for oscillating the same at different speeds and arranged to provide its oscillations optionally in multiple degrees of amplitude, and power actuator means for adjusting the motor control to effect changes in speed of wiper operation and changes in amplitude of wiper oscillation, and manually operated control means for said power actuator.

10. A manually operable indexing actuator for operating a speed control member associated with a wiper motor through a coupling member operatively coupled between said actuator and said speed control member, comprising an indexing lever, an advancing pawl, ratchet means adapted to be driven by said advancing pawl whereby repetitive movement of said indexing lever in a first direction produces repetitive step-wise movement of said ratchet means to thereby actuate said speed control member in increments through said coupling member, a retaining pawl for maintaining said ratchet means in a position to which it was moved by said advancing pawl, means operable in response to movement of said indexing lever in a second direction to terminate contact between said pawls and said ratchet means, and means to return said ratchet means to a wiper parking position when said indexing lever is moved in said second direction.

11. A manually operable indexing actuator adapted to be coupled through a coupling member to a control member associated with a device, said actuator comprising an indexing lever, an advancing pawl, ratchet means adapted to be driven by said advancing pawl whereby repetitive movement of said indexing lever in a first direction produces repetitive step-wise movement of said ratchet means to thereby actuate said control member in increments through said coupling member, a retaining pawl for maintaining said ratchet means in a position to which it was moved by said advancing pawl, means operable in response to movement of said indexing lever in a second direction to terminate contact between said pawls and ratchet means, and means to return said ratchet means to a predetermined position when said indexing lever is moved in said second direction.

12. A manually operable indexing actuator adapted to be coupled through a coupling member to a control member associated with a device, said actuator comprising manually actuable indexing means, control member actuating means adapted to be actuated by said indexing means whereby repetitive step-wise movement of said indexing means in a first direction produces repetitive step-wise movement of said control member actuating means to thereby actuate said control member in increments through said coupling means, retaining means for maintaining said control member actuating means in a position to which it was moved by said indexing means, means operable in response to movement of said manual indexing means in a second direction to terminate contact between said retaining means and said control member actuating means, and means to return said control member actuating means to a predetermined position when said indexing means is moved in said second direction.

References Cited in the file of this patent

UNITED STATES PATENTS

| | | |
|---|---|---|
| 1,684,033 | Josephs | Sept. 11, 1928 |
| 2,074,337 | Krag | Mar. 23, 1937 |
| 2,162,985 | West | June 20, 1939 |
| 2,602,337 | Newman | July 8, 1952 |
| 2,680,262 | Jorgensen | June 8, 1954 |
| 2,722,200 | Horton | Nov. 1, 1955 |